(12) United States Patent
Cooke et al.

(10) Patent No.: US 8,598,532 B2
(45) Date of Patent: Dec. 3, 2013

(54) RADIATION CONVERSION ELEMENTS WITH REFLECTORS FOR RADIOLOGICAL IMAGING APPARATUS

(75) Inventors: Steven E. Cooke, Garfield Heights, OH (US); Andreas Thon, Aachen (DE)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 13/496,303

(22) PCT Filed: Sep. 16, 2010

(86) PCT No.: PCT/IB2010/054193
§ 371 (c)(1),
(2), (4) Date: Mar. 15, 2012

(87) PCT Pub. No.: WO2011/042822
PCT Pub. Date: Apr. 14, 2011

(65) Prior Publication Data
US 2012/0199748 A1 Aug. 9, 2012

Related U.S. Application Data

(60) Provisional application No. 61/249,046, filed on Oct. 6, 2009.

(51) Int. Cl.
*G01T 1/164* (2006.01)
*G01T 1/161* (2006.01)
*G01T 1/20* (2006.01)
*G01T 1/00* (2006.01)

(52) U.S. Cl.
USPC .... 250/363.03; 250/366; 250/368; 250/487.1

(58) Field of Classification Search
USPC .......... 250/363.02, 363.03, 367, 368, 361 R, 250/487.1, 366
See application file for complete search history.

(56) References Cited

U.S. PATENT DOCUMENTS 4,720,426 A * 1/1988 Englert et al. ............... 428/344
4,931,645 A 6/1990 Welsh
(Continued)

FOREIGN PATENT DOCUMENTS

| EP | 0250983 A1 | 1/1988 |
| EP | 1995608 A1 | 11/2008 |
| WO | 2009024895 A2 | 2/2009 |
| WO | 2009060340 A2 | 5/2009 |

OTHER PUBLICATIONS

Orita, N., et al.; Three-Dimensional Array of Scintillation Crystals with Proper Reflector Arrangement for a Depth of Interaction Detector; 2005; IEEE Trans. on Nuclear Science; 52(1)8-14.

*Primary Examiner* — David Porta
*Assistant Examiner* — Faye Boosalis

(57) ABSTRACT

An apparatus comprises a plurality of radiation conversion elements (32) that convert radiation to light, and a reflector layer (34) disposed around the plurality of radiation conversion elements. The plurality of radiation conversion elements may consist of two radiation conversion elements and the reflector layer is wrapped around the two radiation conversion elements with ends (40, 42) of the reflector layer tucked between the two radiation conversion elements. The reflector layer (34) may include a light reflective layer (50) having reflectance greater than 90% disposed adjacent to the radiation conversion elements when the reflector layer (34) is disposed around the plurality of radiation conversion elements, and a light barrier layer (52).

26 Claims, 4 Drawing Sheets

(56) References Cited

U.S. PATENT DOCUMENTS

Figure 1:
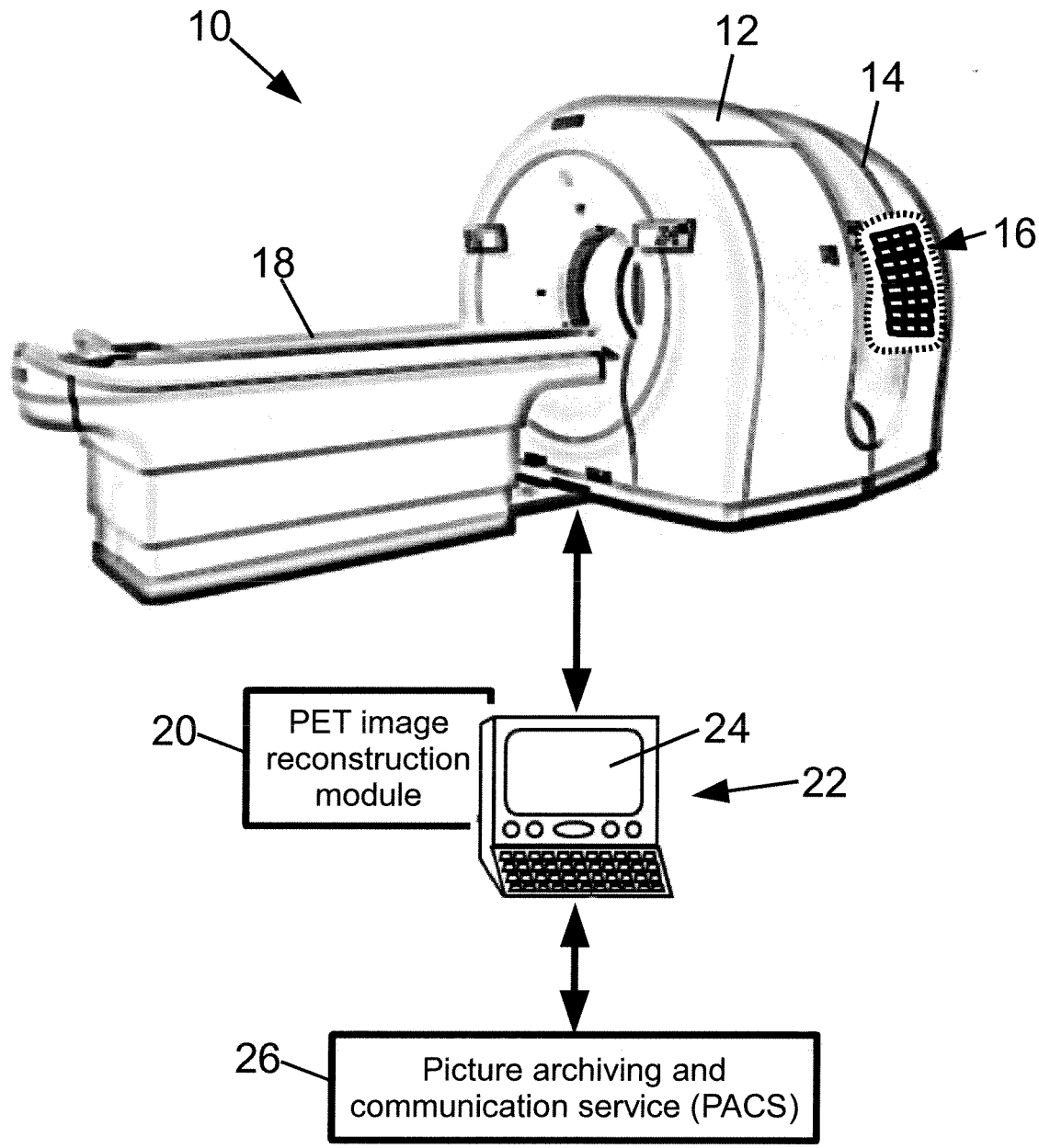

| | | |
|---|---|---|
| 7,323,688 B2 * | 1/2008 | Joung ............... 250/363.02 |
| 8,426,823 B2 * | 4/2013 | Schulz et al. ............ 250/368 |
| 2001/0040219 A1 | 11/2001 | Cherry et al. |
| 2004/0061058 A1 | 4/2004 | Williams |
| 2004/0140431 A1 | 7/2004 | Schmand et al. |
| 2004/0232342 A1 | 11/2004 | Aykac et al. |
| 2005/0016950 A1 | 1/2005 | Andreaco et al. |
| 2005/0104000 A1 * | 5/2005 | Kindem et al. ........... 250/361 R |
| 2005/0129171 A1 | 6/2005 | Jiang et al. |
| 2008/0011953 A1 * | 1/2008 | Srivastava et al. ........ 250/361 R |
| 2008/0093559 A1 | 4/2008 | Dorscheid et al. |
| 2009/0134335 A1 * | 5/2009 | Tsuda et al. ................ 250/368 |
| 2010/0155610 A1 | 6/2010 | Menge et al. |

\* cited by examiner

RADIATION CONVERSION ELEMENTS WITH REFLECTORS FOR RADIOLOGICAL IMAGING APPARATUS

CROSS REFERENCE TO RELATED APPLICATIONS

This application claims the benefit of U.S. provisional application Ser. No. 61/249,046 filed Oct. 6, 2009, which is incorporated herein by reference.

The following relates to the radiological imaging arts, emission tomography imaging arts, radiation detector arts, and related arts.

In radiological imaging, radiation transmitted through a subject (for example, in transmission computed tomography (CT)) or emitted by a subject (for example, in positron emission tomography (PET) imaging or single-photon emission computed tomography (SPECT)) is detected by radiation detectors arranged around the subject, and suitable data processing is applied to reconstruct an image of the subject based on the detected radiation. A typical approach for detecting radiation is to employ a scintillator which absorbs a radiation particle (for example, a gamma ray, an x-ray, an alpha particle, a beta particle, or so forth) and converts the energy of the particle into a burst or scintillation light. An optical detector such as a photomultiplier tube, photodiode, or silicon photomultiplier (SiPM) device is optically coupled with the scintillator to detect the burst of light. The energy of the radiation particle can be estimated from the integrated intensity of detected light. To provide spatial resolution, an array of photodetectors can be employed, and additionally Anger logic or other processing can be used to further localize the detection event. However, spatial resolution achievable in this fashion is limited.

To provide better spatial resolution, the scintillator can be segmented into pixels. For example, an array of 4×4×22 mm³ scintillator elements can be employed to provide spatial resolution in the order of 4 mm (the 22 mm dimension provides depth so as to increase likelihood of absorption of the radiation particle). The array of scintillator pixels can be optically coupled with an array of photodetectors, where the size of each photodetector is larger than that of one scintillator pixel, and Anger logic or other processing is used to localize the detection event. It is advantageous, however, if each scintillator element is optically coupled with a single photodetector in a one-to-one fashion so that the pixels of the radiation detector array operate independently.

To ensure that the scintillation light is retained and detected, reflectors are disposed on the top and sides of the scintillator element so as to drive the scintillation light towards the photodetector located at the bottom of the scintillator element. (In this description, "top" denotes the radiation-incident face of the scintillator element while "bottom" denotes the opposite face of the scintillator element proximate to the photodetector). This approach can also improve temporal resolution.

In addition to collecting the light, another purpose of the reflectors is to prevent optical cross-talk between adjacent pixels. Optical cross-talk results when photons of scintillation light travel from one scintillator element to an adjacent scintillator element so as to be detected by the adjacent pixel. Such cross-talk is generally considered detrimental since light is lost. Another type of cross-talk is Compton scattering of the radiation particle from one scintillator element to an adjacent scintillator element. This type of cross-talk is generally considered acceptable, because the signal processing can recognize that the combined intensity of light detected by the two pixels corresponds to a single radiation detection event.

Although the reflectors are intended to prevent optical cross-talk, their effectiveness for this purpose can be less than satisfactory. On average for a typical scintillator element, a photon of scintillation light undergoes around 10-100 reflection events before reaching the photodetector. In view of these multiple reflections (e.g., 10 reflections), a reflector having 99% reflectivity will actually capture only about 90% of the scintillation light. A reflector having a lower reflectivity of 95% will capture only about 60% of the scintillation light.

Other problems with existing reflector designs relate to manufacturing complexity and device yield. For example, some approaches employ adhesives for attaching the reflectors to the scintillator elements. However, the adhesive can adversely impact reflectivity, the process of gluing reflectors onto the four sides of the scintillator element increases manufacturing complexity, and detachment of any of the adhered reflectors results in pixel failure thus adversely impacting yield. Other approaches involve coating the reflector as a film onto the sides of the scintillator element. However, this entails a complex three-dimensional deposition process (for example, rotating the scintillator element during deposition in order to coat all sides), and the reflectivity of the coating can be less than desired. Other approaches involve wrapping the scintillator element with Teflon tape. However, to enable structural stability suitable for manufacturing the Teflon tape is typically wound around the scintillator element multiple times, which increases thickness and adversely impacts the active area of the array of scintillator elements.

The following provides new and improved apparatuses and methods which overcome the above-referenced problems and others.

In accordance with one disclosed aspect, an apparatus comprises a plurality of radiation conversion elements that convert radiation to light and a reflector layer disposed around the plurality of radiation conversion elements.

In accordance with another disclosed aspect, the apparatus of the immediately preceding paragraph is disclosed, wherein the plurality of radiation conversion elements consists of two radiation conversion elements and the reflector layer is wrapped around the two radiation conversion elements with ends of the reflector layer tucked between the two radiation conversion elements. In accordance with another disclosed aspect, the apparatus of the immediately preceding paragraph is disclosed, wherein the reflector layer comprises a light reflective layer having reflectance greater than 90% disposed adjacent to the radiation conversion elements when the reflector layer is disposed around the plurality of radiation conversion elements, and a light barrier layer.

In accordance with another disclosed aspect, a method is disclosed comprising wrapping a light reflective layer around a plurality of radiation conversion elements that convert radiation to light to define a detector array scintillator building block.

In accordance with another disclosed aspect, an apparatus comprises: a radiation conversion element that converts radiation to light; and a reflector layer disposed around the radiation conversion element, the reflector layer comprising a light reflective layer disposed adjacent the radiation conversion element and a light barrier layer disposed distal from the radiation conversion element.

In accordance with another disclosed aspect, the apparatus of the immediately preceding paragraph is disclosed, further comprising an optical detector element optically coupled with the radiation conversion element to define a single pixel of a radiation detector array having a one to one correspondence between radiation conversion elements and optical detector elements, wherein a cross-sectional area of the combination of the radiation conversion element and the reflector layer disposed around the radiation conversion element is equal to or less than a cross-sectional area of the optical detector element optically coupled with the radiation conversion element.

One advantage resides in reduced optical cross-talk between pixels of a radiation detector array.

Another advantage resides in an increased amount of scintillation light incident on the photodetectors.

Another advantage resides in improved accuracy in radiation event detections.

Another advantage resides in improved manufacturability of an array of scintillator elements.

Further advantages will be apparent to those of ordinary skill in the art upon reading and understanding the following detailed description.

FIG. 1 diagrammatically illustrates a positron emission tomography (PET) imaging system as an example of a radiological imaging apparatus suitably employing radiation conversion elements with reflectors as disclosed herein.

Figure 2:
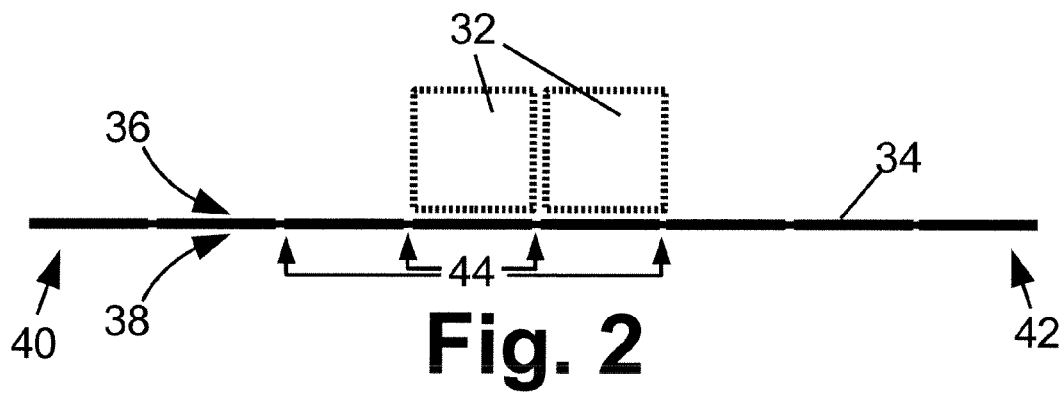
Figure 3:
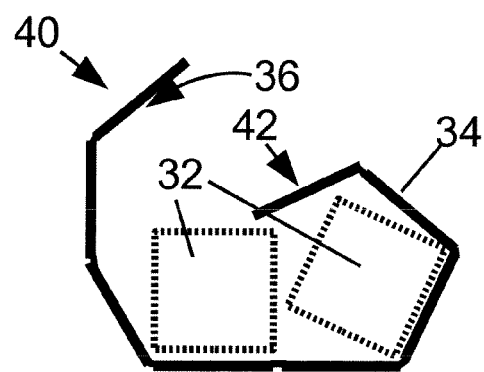
Figure 4:
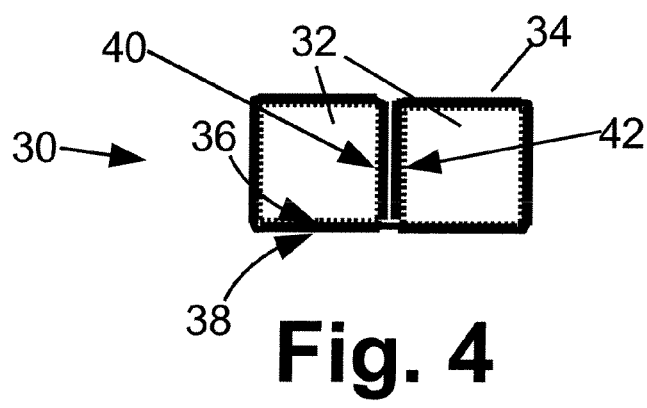

FIGS. 2-4 diagrammatically illustrate fabrication of a detector array scintillator building block comprising a pair of radiation conversion elements wrapped with a reflector layer.

Figure 5:
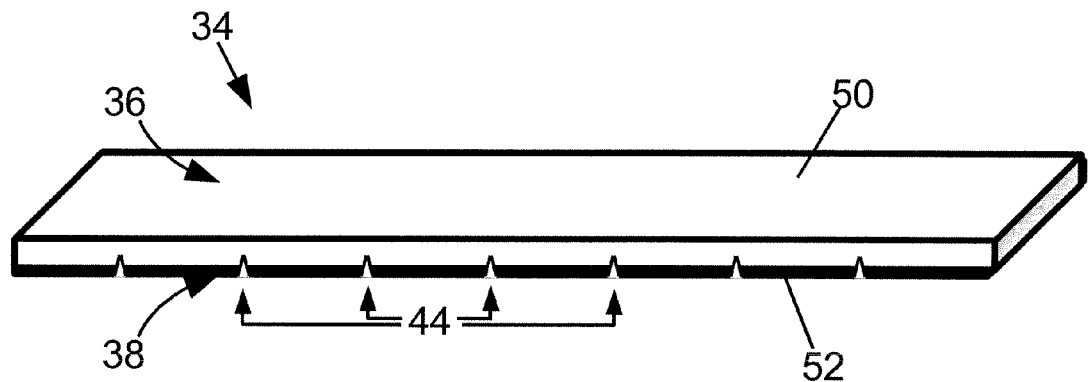

FIG. 5 diagrammatically illustrates a suitable reflector layer comprising a light-reflective layer and a light barrier layer.

Figure 6:
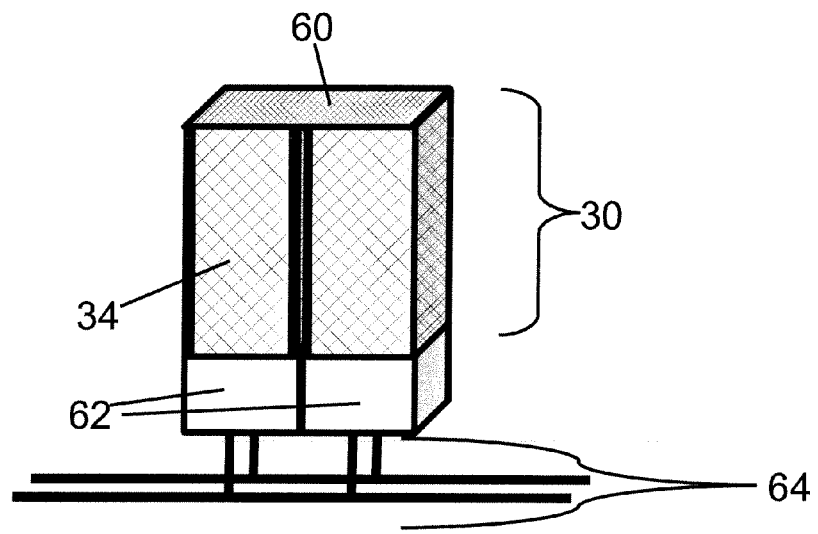

FIG. 6 diagrammatically illustrates two adjacent pixels of a radiation detector array employing the detector array scintillator building block constructed as described with reference to FIGS. 2-4.

Figure 7:
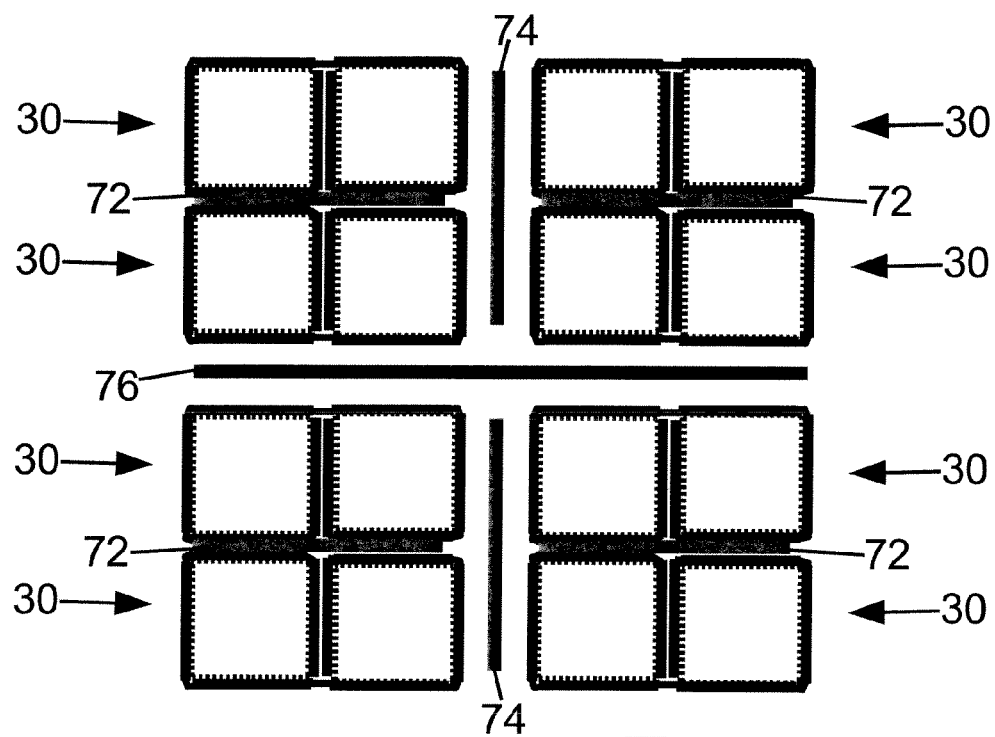
Figure 8:
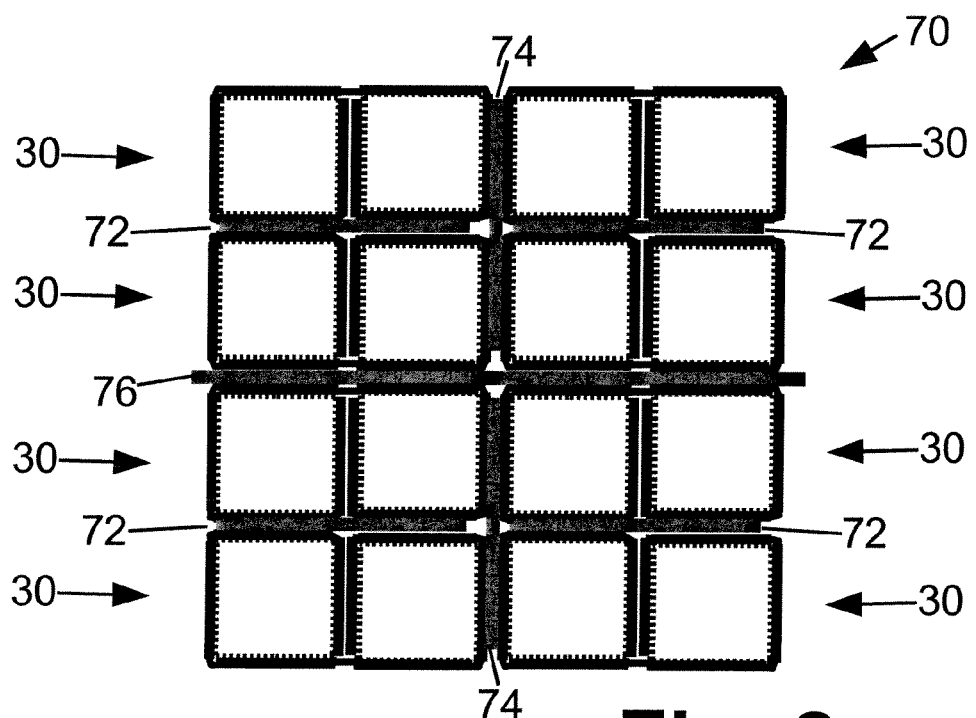

FIGS. 7-8 diagrammatically illustrate building a scintillator array from a plurality of detector array scintillator building blocks constructed as described with reference to FIGS. 2-4.

With reference to FIG. 1, an illustrative example is shown of a radiological imaging apparatus suitably employing radiation conversion elements with reflectors as disclosed herein. The illustrative example is a hybrid PET/CT imaging system 10 which in the illustrated embodiment is a GEMINI™ PET/CT imaging system (available from Koninklijke Philips Electronics N.V., Eindhoven, The Netherlands). The hybrid PET/CT imaging system 10 includes a transmission computed tomography (CT) gantry 12 configured with an x-ray tube or other x-ray source and an x-ray detector array (internal components not shown) configured to acquire CT images. The hybrid PET/CT imaging system 10 also includes a positron emission tomography (PET) gantry 14 which contains a radiation detector array 16 (diagrammatically shown in part by partial cutaway of the PET gantry 14) arranged as an annular ring within the PET gantry 14. The hybrid PET/CT imaging system 10 is a "hybrid" system in that a common lineal subject transport system 18 is arranged to transport an imaging subject into either of the CT or PET gantries 12, 14.

Although a hybrid imaging system is illustrated in FIG. 1, the disclosed radiation conversion elements, radiation detectors, and so forth are also suitable for use in standalone radiological imaging systems. Moreover, while in the following description the scintillator elements of the PET radiation detector array 16 is used as an illustrative example, the disclosed radiation conversion elements, radiation detectors, and so forth are also suitable for use in radiation detectors for other radiological imaging systems such as in the illustrated CT imaging gantry 12, or in a gamma camera (not illustrated) for use in performing single photon emission computed tomography (SPECT), or so forth.

With continuing reference to FIG. 1, to perform PET imaging a subject is administered a radiopharmaceutical that includes a radioisotope that emits positrons which decay in electron-positron annihilation events each of which emits two oppositely directed 511 keV gamma particles. With the subject disposed in the PET gantry 14, these 511 keV gamma particles are detected by the annular PET radiation detector array 16 as two substantially simultaneous 511 keV detection events. The time, energy and spatial location (e.g., locations of the involved detector pixels) for these substantially simultaneous 511 keV detection events are recorded. It is known that the sourcing electron-positron annihilation event occurred somewhere along the line connecting the two substantially simultaneous 511 keV detection events.

In some embodiments, the time difference between the two substantially simultaneous 511 keV detection events (or lack of such time difference, for precisely simultaneous detection events) is also recorded—this is referred to as time-of-flight information, and can provide localization of the sourcing electron-positron annihilation event along the line connecting the two substantially simultaneous 511 keV detection events. For example, if there is no time difference then the sourcing electron-positron annihilation event likely occurred about midway between the pixels that detected the two substantially simultaneous 511 keV detection events; whereas, if a first detection event precedes a second detection event then the sourcing electron-positron annihilation event likely occurred relatively closer to the pixel that detected the first detection event and relatively further away from the pixel that detected the second detection event.

The collected PET data (or TOF-PET data, in the case of a TOF-PET embodiment) are processed by a PET image reconstruction module 20, for example suitably embodied by an illustrated computer 22 (although other digital data processing devices are also contemplated) executing a reconstruction algorithm such as a filtered backprojection algorithm, an iterative backprojection algorithm, or so forth, which generates a reconstructed PET image from the collected PET data. The reconstructed PET image may be displayed on a display 24 of the computer 22, stored in a picture archiving and communication system (PACS) 26, or otherwise utilized and/or stored.

Although not illustrated, it is to be understood that CT imaging data acquired by the CT gantry 12 may be similarly processed by a CT image reconstruction processor (optionally also embodied by the computer 22, or alternatively embodied by another computer or other different digital data processing device) to generate a reconstructed CT image that may be displayed on the display 24, stored in the PACS 26, or otherwise utilized and/or stored. Advantageously, the hybrid PET/CT imaging system 10 may employ a common coordinate system for CT and PET imaging, thus facilitating fusion or other combination of the CT and PET images.

With reference to FIGS. 2-4, a suitable method for constructing a detector array scintillator building block 30 is described. (FIG. 4 illustrates the constructed building block 30). In the illustrated approach, two radiation conversion elements 32, such as scintillator elements, are wrapped by a single reflector layer 34. In FIGS. 2-4 the scintillator elements 32 are viewed "on-end" so that the viewed cross-sectional area corresponds to the pixel area. The scintillator elements 32 also have a third dimension, into the page in the on-end view of FIGS. 2-4, which is the depth dimension of the pixels. Typically, the side dimensions of the pixel area are substantially smaller than the depth dimension. By way of one illustrative specific example, each scintillator element 32 may have dimensions $4 \times 4 \times 22$ mm$^3$, where the $4 \times 4$ mm$^2$ cross-sectional area corresponds to the pixel area visible in FIGS. 2-4, and the 22 mm dimension corresponds to the depth dimension which is "into the page" and hence not visible in the on-end views of FIGS. 2-4.

The single reflector layer 34 has a highly reflective side 36 and an opposite back side 38 that may be highly reflective, or may be somewhat reflective but not as reflective as the highly reflective side 36, or that may be non-reflective. As shown in the successive sequence of FIGS. 2, 3, and 4, the single reflector layer 34 is wrapped around the two radiation conversion elements 32 and ends 40, 42 of the reflector layer are tucked between the two radiation conversion elements 32. As a result, the reflector layer 34 is disposed as a single layer around an outside of the two radiation conversion elements 32 and as a double layer comprising the ends 40, 42 between the two radiation conversion elements. The reflector layer 34 is wrapped around the two radiation conversion elements 32 with the highly reflective side 36 adjacent or facing the scintillator elements 32 and with the back side 38 away from or distal from the scintillator elements 32, so that the highly reflective side is suitably positioned to trap scintillation light within the scintillator elements 32.

The reflector layer 34 may be made of any layer or sheet having the requisite highly reflective side 36 and that can be bent as shown in FIGS. 3-4 in order to wrap around the scintillator elements 32. For example, in some embodiments the reflector layer 34 is or includes a multi-layer polymer reflector, such as a Vikuiti™ reflector sheet (available from 3M, St. Paul, Minn., USA), a metallic foil, or so forth. It is to be understood that the highly reflective side 36 is chosen to be highly reflective at least for the light spectrum of the scintillation light, which in turn depends upon the scintillator material and the type and energy of the radiation particles to be detected.

In some embodiments, the reflector layer 34 may not be sufficiently bendable in its unmodified form to be wrapped as shown in FIGS. 3-4. For example, the plastic substrate of a typical Vikuiti™ multi-layer polymer reflector is not sufficiently bendable to conform to the 90° turns shown in FIG. 4. In such embodiments, scribe lines 44 (labeled only in FIG. 2) are suitably formed on the back side 38 as illustrated, or on the front side 36 (not illustrated), or on both sides, of the reflector layer 34 to faciliate the sharp (e.g., 90°) turns.

With continuing reference to FIGS. 2-4 and with further reference to FIG. 5, an illustrative embodiment of the reflector layer 34 is described. In this embodiment the reflector layer 34 includes a light-reflective layer 50 that is adjacent to the scintillator elements 32 when the reflector layer 34 is disposed around the scintillator elements 32. In some embodiments, the light-reflective layer 50 has reflectance greater than 90%. In some embodiments, the light-reflective layer 50 has reflectance greater than 95%. In some embodiments, the light-reflective layer 50 has reflectance of about 99% or greater. In some embodiments, the light-reflective layer 50 is a multi-layer polymer reflector, such as a Vikuiti™ reflector sheet (available from 3M, St. Paul, Minn., USA).

The reflector layer 34 optionally further includes a light barrier layer 52 disposed distal from the scintillator elements 32 when the reflector layer 34 is disposed around the scintillator elements 32. The primary purpose of the light barrier layer 52 is to prevent optical cross-talk between adjacent pixels. Toward this end, in some embodiments the light barrier layer 52 has a thickness and optical absorption sufficient to reduce optical cross-talk between neighboring scintillator elements 32 around which the reflector layer is disposed by at least 15%. In some embodiments, the light barrier layer 52 has a thickness and optical absorption sufficient to reduce optical cross-talk between neighboring scintillator elements 32 around which the reflector layer is disposed by at least 20%. In some embodiments, the light barrier layer 52 is an aluminum layer having a thickness of about five microns or more, although thinner aluminum layers are also contemplated. The choice of thickness depends on factors such as the wavelength or spectrum of light to be blocked, the uniformity of the layer deposition technique for the given substrate, and so forth, balanced against manufacturing considerations such as deposition time and material cost. The aluminum layer is suitably deposited onto the backside of the light-reflective layer 50 (for example, the backside of a Vikuiti™ sheet) by vacuum evaporation, sputtering, ion vapor deposition (IVD), physical vapor deposition (PVD), or another film deposition technique. Optionally, a thin adhesion layer may be deposited first in order to enhance adhesion of the aluminum layer to the light-reflective layer 50.

Advantageously, the use of a separate light-reflective layer 50 and light barrier layer 52 enables each layer to be optimized for its intended purpose, while simultaneously fulfilling any maximum thickness constraint that may be imposed by the desired spacing of the pixels in the detector array. For example, although a multi-layer polymer reflector can be made highly reflective, the constituent polymers are typically made of optically transparent or translucent material and as a result the multi-layer polymer reflector is difficult to make completely opaque. Additional opacity of the multi-layer polymer reflector is achieved by using more layers in the multi-layer structure, but this adversely impacts thickness. (For example, some Vikuiti™ sheets suitably used as the light-reflective layer 50 have thickness of about 65 microns and are still not sufficiently opaque). On the other hand, an aluminum layer is suitably opaque at only a few microns. However, aluminum is a highly optically absorbing material, and so using aluminum as the reflector material may be undesirable as it may introduce unacceptable light absorption losses.

The primary purpose of the light barrier layer 52 is to prevent any light that gets past the light reflective layer 50 from reaching an adjacent scintillator element and thus contributing to optical cross-talk. In general, the light barrier layer 52 may be highly reflective, or may be somewhat reflective but not as reflective as the highly reflective layer 50, or may be non-reflective. If the light barrier layer 52 is highly reflective or somewhat reflective, then it may contribute to the reflectance of the highly reflective side 36 of the reflector layer 34. This is typically the case for the combination of a Vikuiti™ sheet as the highly reflective layer 50 and a coated aluminum layer as the light barrier layer 52. Such a reflectivity contribution from the light barrier layer 52, if present, is a further benefit of the light barrier layer 52.

There are, in general, two contributions to retention of light in the scintillator element 32. One contribution is reflection of light by the highly reflective side 36 of the reflector layer 34. Another contribution is total internal reflection (TIR) of light at the (inside) surface of the scintillator element 32. In general, TIR occurs when Snell's law predicts the angle of the "transmitted" light referenced to the surface normal is equal to or greater than 90°. Denoting the refractive index of the scintillator material as $n_s$ and the refractive index of the material immediately adjacent the scintillator element 32 as $n_a$, the condition for TIR is $\theta \geq \arcsin(n_a/n_s)$ where $\theta$ is the angle of incidence of light inside the scintillator element 32 on the (inside) surface of the scintillator element 32, again referenced to the surface normal. Thus, TIR is highest for $n_a=1$, decreases for $n_a>1$, and disappears entirely for $n_a>n_s$.

If the reflector is intimately attached to the scintillator element, as in the case of a reflector that is glued or adhered onto the scintillator element, then $n_a$ is the refractive index of the reflector material or of the glue or adhesive, which is usually larger than that of air. It follows that gluing or adhering the reflector onto the scintillator element reduces or even eliminates TIR. On the other hand, if the reflector is spaced apart from the scintillator element by an air gap of width more than the evanescent wave penetration depth for the scintillator/air interface, then $n_a$ is the refractive index of the ambient air. Advantageously, by wrapping the reflector layer 34 around the scintillator elements 32 as described herein with reference to FIGS. 2-4, an air gap of a few microns or more (taken as an average over the surface area) is generally present between the surface of the scintillator elements 32 and the reflector layer 34. Accordingly, the wrapping approach of FIGS. 2-4 advantageously substantially retains the TIR contribution to light retention.

To further enhance or ensure TIR contribution to light retention, the reflector layer 34 shown in FIG. 5 may optionally include protruding elements or structures (not shown) on the light-reflective layer 50 which serve as spacers to ensure an air gap between the reflector layer 34 and the scintillator elements 32 that is sufficient to support TIR. Additionally or alternatively, such spacers could be placed on the scintillator elements 32 prior to wrapping the reflector layer 34 around them.

Another contemplated variation is for the reflector layer 34 to include a structural former or support (not illustrated) that supports the light-reflective layer 50 and the optional light barrier layer 52. For example, the reflective layer 50 and optional light barrier layer 52 can be manufactured as a rigid or semi-rigid sheet that is cut in pieces along scribe lines and attached to an additional support layer which is sufficiently bendable to conform to the 90° turns shown in FIG. 4. Attachment of the additional support layer can be done before or after cutting the light-reflective layer 50 and optional light barrier layer 52 in pieces. The structural former or support layer, if employed, can be either optically active or optically inactive (e.g., a transparent support sheet that provide negligible reflectance and negligible light absorption).

With reference to FIG. 6, a pair of detector pixels constructed from the detector array scintillator building block 30 is described. FIG. 6 shows a perspective view of the detector array scintillator building block 30 (so that the longer depth dimension is now visible) after wrapping the scintillator elements 32 with the reflector layer 34. Additionally, the top side (i.e., the side facing the incident radiation source, that is, facing the examination region in the case of the PET gantry 14) is covered by a top reflector 60 which in the illustrated embodiment is separate from the reflector layer 34. Alternatively, the top reflector could be integral with the reflector layer 34. Typically, the top reflector 60 contributes one reflection to the retention of a light ray. (For example, any "upward" directed light reflects once from the top reflector 60 and thereafter is funneled "downward" by the reflector layer 34 and/or by TIR toward the photodetector). As a result, the reflectivity of the top reflector 60 is not as critical as the reflectivity of the reflector layer 34, and the top reflector 60 may for example be attached by glue or another adhesive.

A pair of optical detector elements 62 are located at the "bottom" side of the detector array scintillator building block 30 opposite the side having the top reflector 60. The two optical detector elements 62 are optically coupled in a one-to-one fashion with respective ones of the two scintillator elements 32 of the detector array scintillator building block 30. For example, each optical detector element 62 may be a photodiode that views a corresponding scintillator element. As another example, each optical detector element 62 may be a silicon photomultiplier (SiPM) element that views a corresponding scintillator element. A suitable electrical interconnect backbone 64 (shown diagrammatically in FIG. 6) is provided to supply operating electrical power to the optical detector elements 62 and to read the optical detector elements 62. For example, the electrical interconnect backbone 64 may include a printed circuit board with electronic components configured to define photodiode driver and readout circuitry.

It is also contemplated to interchange the positions of the reflector 60 and the optical detector elements 62 (interchanged arrangement not illustrated) such that the optical detector elements 62 are coupled to the "top" sides of the scintillator elements 32 (that is, toward the source of radiation particles), and the reflector 60 to the "bottom" side. As long as the photodetector elements do not cause substantial absorption or scatter of the radiation particles, such an arrangement is not detrimental.

In another variant embodiment (not illustrated), some of the optical detector elements 62 may be coupled to the "top" sides of the scintillator elements 32, and some of the optical detector elements 62 to the "bottom" side, while the respective opposite sides of the scintillator elements 32 are covered with a reflector 60. Such an arrangement can be advantageous if, for example, the size of the optical detector elements 62 is larger than the size of the scintillator elements 32.

In the embodiment shown in FIG. 6, the cross-sectional area of the building block 30 (including the combination of the two scintillator elements 32 and the reflector layer 34 disposed around the two scintillator elements 32) is equal to the cross-sectional area of the two optical detector elements 62 that are optically coupled with the radiation conversion elements. Stated more generally, in some embodiments the cross-sectional area of the building block (including the combination of the scintillator element and the reflector layer disposed around the scintillator element) is equal to or less than the cross-sectional area of the optical detector element that is optically coupled with the radiation conversion elements of the building block.

The rationale for these embodiments is as follows. As already noted, there are in general two contributions to the retention and collection of scintillation light: (i) reflections by the external reflectors 34, 60; and (ii) total internal reflection (TIR). Without being limited to any particular theory of operation, it is believed that the combination of these mechanisms results in a substantial contribution of the scintillation light being wave guided along the air gap between the scintillator elements 32 and the reflector layer 34. As a result, if the cross-sectional area of the combination of the scintillator element and the reflector layer that is disposed around the scintillator element is larger than the cross-sectional area of the optical detector element that is optically coupled with the scintillator element, then a substantial portion of this wave guided peripheral scintillation light may fall outside the active detector area of the optical detector element and therefore be lost. On the other hand, by making the cross-sectional area of the combination of the scintillator element and the reflector layer equal to or less than the cross-sectional area of the optical detector element, this wave guided peripheral scintillation light falls within the active detector area of the optical detector element and accordingly contributes to the detector signal output.

With reference to FIGS. 7 and 8, the assembly of a radiation conversion element array 70 (completed array shown in FIG. 8) comprising a plurality of the detector array scintillator building block 30 arranged as an array is described. The illustrated detector array 70 is a two-dimensional 4×4 array with 16 elements, but arrays of larger numbers of elements can be similarly constructed, and an annular array (such as the detector array 16 of the PET gantry 14 of FIG. 1) can be constructed by combining planar two-dimensional array end-to-end with neighboring planar arrays at slight angles to each other to form an N-sided polygon where N is large enough to approximate a circle. The 4×4 array is constructed of eight detector array scintillator building block 30, each of which contains two elements. FIGS. 7 and 8 show "on-end" views of the building block 30 (that is, the same "on-end" view as in FIG. 4).

Each building block 30 is surrounded on all sides by the back side 38 of the reflector layer 34. Moreover, where the reflector layer 34 includes a light barrier layer 52 disposed distal from the scintillator elements 32 when the reflector layer 34 is disposed around the scintillator elements 32 (as in the reflector layer 34 shown in FIG. 5), each building block 30 is surrounded on all sides by the light barrier layer 52. Thus, there is no impediment to using glue or adhesive in joining adjacent building blocks 30. FIG. 7 shows an intermediate state of the assembly, in which each building block 30 is glued or adhered to another building block 30 by glue or adhesive 72 so as to form a 2×2 element sub-array (four 2×2 element sub-arrays in all). Additional glue or adhesive 74 is then used to form two 4×2 element sub-arrays (shown in exploded view in FIG. 7 and joined in FIG. 8), and still further glue or adhesive 76 is then used to form the final 4×4 element array 70 (again shown in exploded view in FIG. 7 and joined in FIG. 8). It will be appreciated that such construction can be continued in similar fashion to form an M×N array where M and N are integers.

In FIGS. 2-4, the reflector layer 34 is applied to the pair of scintillator elements 32 by wrapping and tucking the ends 40, 42 of the reflector layer 34 between the scintillator elements 32. This approach has the advantage of creating the 2×1 element building block 30 which is relatively structurally rigid and wholly surrounded on four sides and in-between by the reflector layer 34. These building blocks 30 are then readily used to construct an arbitrary one-dimensional or two-dimensional detector array. However, other fabrication processes are also contemplated. For example, in some embodiments a small amount of glue or adhesive (not shown) is disposed between the two ends 40, 42 of the reflector layer 34 when they are tucked in between the scintillator elements 32. This can make the building block 30 still more structurally rigid. Other wrapping patterns are also contemplated. Although in the specific example the scintillator elements 32 had dimensions 4×4×22 mm, in general the scintillator elements can have dimensions i×j×k where in general i, j, and k may each be a different dimension (for example, dimensions 4×6×22 mm) Still further, scintillator elements having non-square and non-rectangular cross-sections are contemplated.

In some embodiments, the array might not be rectangular as in FIGS. 7 and 8. For example, elements of the array might be shifted relative to their neighbors. In one such arrangement, a building block 30 is glued or adhered to another building block 30 by glue or adhesive 72 so as to form a 2×2 element sub-array, in which one building block 30 is shifted relative to the other building block 30 by half the size of one scintillator element 32. In another such arrangement, each 2×2 element sub-array might form a rectangular array, while being shifted relative to the neighboring 2×2 element sub-array, and so forth.

With reference to FIGS. 7 and 8, the glue or adhesive between the building blocks 30, between 2×2 element sub-arrays, and so forth, is typically chosen to be thin so as to achieve a high packing fraction of the scintillator array. However, in some embodiments it might be advantegeous to choose a relatively larger thickness of the glue or adhesive such that the resulting array 70 of scintillator elements 32 matches the array of photodetector elements 62. For the same reason, additional glue or adhesive or similar material might be introduced in between the ends 40, 42 of the reflector layer 34 to create additional separation between the scintillator elements 32.

The embodiments of the reflector layer 34 described with reference to FIG. 5 are also illustrative. For example, instead of the multi-layer polymer reflector set forth by way of example, the light-reflective layer 50 may be another material or multi-layer structure such as Teflon tape, white polyester reflector material, or so forth. Similarly, while coated aluminum is disclosed by way of example for the light barrier layer 52, other suitably optically absorbing materials may be used such as other metals, and instead of depositing the light barrier layer 52 on the light-reflective layer 50 the light barrier layer 52 may be applied to the light-reflective layer 50 by pressing or gluing (for example using a metal foil as the light barrier layer 52, which is pressed or glued onto the light-reflective layer 50). Still further, it is contemplated to use the light barrier layer 52 as a substrate and to deposit or otherwise form the light-reflective layer 50 on the light barrier layer. Still further, while benefits have been identified for using the illustrative reflector layer 34 comprising separate light-reflective and light barrier layers 50, 52, it is also contemplated to use a single-layer for the reflector layer 34, where the single layer performs both reflection and optical cross-talk suppression functions. For example, the reflector layer can be a single-layer metal foil that is wrapped around the scintillator elements 32 as shown in FIGS. 3-4.

An example of the building block fabrication process of FIGS. 2-4 is now described, which was actually performed. In this example, the reflector layer or foil 34 was a single-layer Vikuiti™ sheet or foil, without the separate light barrier layer 52. In a first step, the reflector foil was slightly scratched or scribed to form the folding scribe lines 44. This ensures precise folding of the Vikuiti™ foil, which in this example was 65 µm thick and relatively stiff. In the actually-performed experiments, the scratching or scribing was done rapidly using a fine conical milling tool on a motorized x-y stage normally used to process prototype printed circuit board (PCB) components. The x-y stage had a positioning accuracy of about 8 µm. The scribe lines 44 were cut about 50 µm deep to allow for easy folding. The protective liner on the high-reflectivity side of the Vikuiti™ foil (that is, the side that was away from the milling tool during scribing) was left in place during this process. The same tool was used to cut the contour of the reflector layer. Optionally, the contour cutting might not go completely through the protective liner of the Vikuiti™ foil, thus avoiding to have to handle many small parts. Other methods for forming the scribe lines 44 are also contemplated, such as laser scribing, scribing using a cutting plotter, or so forth. After the scribing and reflector layer separation, the protective liner of the Vikuiti™ foil was removed and folded along the scribe lines 44. In the actually performed experiments the folding was done manually; however for larger scale production is contemplated to employ an automatic folding machine. The folding can employ the scintillator elements directly, or alternatively folding can be done around dummies or blanks made from metal, plastic, or so forth and the scintillator elements inserted later into the completed reflector grids.

If the light barrier layer 52 is desired, then the above process could be suitably modified by coating the backside of the Vikuiti™ foil with aluminum by vacuum deposition or another deposition technique. The temperature of the Vikuiti™ foil during deposition should be kept low enough to avoid thermally damaging the Vikuiti™ foil. The scribing and wrapping processing is then performed as before. In another approach, a thin aluminum foil or other light barrier layer is glued or adhered to the backside of the Vikuiti™ foil before or after scribing. In some such embodiments, it may be useful to glue or adhere the aluminum foil after scribing, with the aluminum foil adhered only between the scribe lines so as not to interfere with the wrapping.

Once the building blocks 30 were fabricated, two 2×1 building blocks were glued together as per FIG. 7. In the actually performed assembly, this was done using a thin double-sided adhesive foil (Optical Clear Adhesives, available from 3M, which have 25 µm thickness and have liners on both sides). Using adhesive foil rather than glue as the adhesive is expected to facilitate handling and improve yield, as no glue is present to creep in between the scintillator element and the reflector. Using the adhesive foil also promotes precise separations between pixels. However, using other adhesives or glues is also contemplated. Positioning of the 2×1 building blocks 30 relative to each other was easily achieved by placing them in a groove with a width equal to that of the two scintillator elements 32 wrapped in the reflector layer 34.

Measurements of the actually constructed reflectors have shown that the light output is within 95% of that achieved with five-to-ten layer wrappings of Teflon tape. It is to be recognized that such multiple-layer Teflon wrapping would result in an unpractical thickness for the reflector. The light output was substantially higher than that obtained using a single Teflon layer. Further measurements have shown that the top reflector 60 (see FIG. 6) can be glued to the crystals without loss in light yield. Again, without being limited to any particular theory of operation, this is believed to be a consequence of each light ray being reflected from the top reflector 60 typically no more than once. Recognizing this, it is contemplated for the top reflector 60 to be a continuous glued reflector spanning the entire front side of the array, which is expected to provide substantial rigidity to the detector array.

As another variation, it is contemplated to utilize the scribing operations that form the scribe lines 44 to additionally define alignment features, such as studs for easy alignment with the photo detector array (that is, the optical detector elements 62).

This application has described one or more preferred embodiments. Modifications and alterations may occur to others upon reading and understanding the preceding detailed description. It is intended that the application be construed as including all such modifications and alterations insofar as they come within the scope of the appended claims or the equivalents thereof.

The invention claimed is:

1. An apparatus comprising:
  a plurality of radiation conversion elements that convert radiation to light; and
  a reflector layer disposed around the plurality of radiation conversion elements;
  wherein the reflector layer is wrapped around the plurality of radiation conversion elements without adhesive being disposed between the radiation conversion elements and the reflector layer.

2. The apparatus as set forth in claim 1, wherein the reflector layer disposed around the plurality of radiation conversion elements comprises:
  a light-reflective layer having reflectance greater than 90% disposed adjacent to the radiation conversion elements when the reflector layer is disposed around the plurality of radiation conversion elements; and
  a light barrier layer.

3. The apparatus as set forth in claim 2, wherein the light barrier layer comprises an aluminum layer.

4. The apparatus as set forth in claim 2 wherein the light barrier layer also contributes to reflectance of the reflector layer disposed around the plurality of radiation conversion elements.

5. The apparatus as set forth in claim 2, wherein the light-reflective layer comprises a multi-layer polymer reflector.

6. The apparatus as set forth in claim 2, wherein the light barrier layer reduces optical cross-talk between the plurality of radiation conversion elements around which the reflector layer is disposed by at least 15%.

7. The apparatus as set forth in claim 1, wherein the reflector layer disposed around the plurality of radiation conversion elements includes scribe lines defining bends of the reflector layer disposed around the plurality of radiation conversion elements.

8. The apparatus as set forth in claim 1, wherein the plurality of radiation conversion elements comprise a plurality of scintillator elements and the apparatus further comprises:
  a plurality of optical detector elements optically coupled with the plurality of radiation conversion elements.

9. The apparatus as set forth in claim 8, wherein the apparatus comprises a positron emission tomography (PET) imaging apparatus including a 511 keV radiation detector that includes the plurality of radiation conversion elements and the reflector layer disposed around the plurality of radiation conversion elements.

10. The apparatus as set forth in claim 8, wherein each radiation conversion element of the plurality of radiation conversion elements is optically coupled with one optical detector element of the plurality of optical detector elements.

11. The apparatus as set forth in claim 8, wherein the plurality of radiation conversion elements and the reflector layer disposed around the plurality of radiation conversion elements together define a building block, and a cross-sectional area of the building block is equal to or less than a cross-sectional area of the plurality of optical detector elements optically coupled with the plurality of radiation conversion elements.

12. The apparatus as set forth in claim 11, wherein the cross-sectional area of the building block equals the cross-sectional area of the plurality of optical detector elements optically coupled with the plurality of radiation conversion elements.

13. An apparatus comprising:
  two radiation conversion elements that convert radiation to light; and
  a reflector layer disposed around the two radiation conversion elements;
  wherein the reflector layer is disposed as a single layer around an outside of the two radiation conversion elements and as a double layer between the two radiation conversion elements.

14. The apparatus as set forth in claim 13, wherein the reflector layer is wrapped around the two radiation conversion elements with ends of the reflector layer tucked between the two radiation conversion elements.

15. The apparatus as set forth in claim 13, wherein the reflector layer is wrapped around the plurality of radiation conversion elements without adhesive being disposed between the radiation conversion elements and the reflector layer. the plurality of two radiation conversion elements and the reflector layer disposed around the plurality of two radiation conversion elements together define a building block, and the apparatus further comprises: a radiation conversion element array comprising a plurality of said building blocks arranged as an array.

16. The apparatus as set forth in claim 13, wherein the plurality of two radiation conversion elements and the reflector layer disposed around the plurality of two radiation conversion elements together define a building block, and the apparatus further comprises:
a radiation conversion element array comprising a plurality of said building blocks arranged as an array.

17. The apparatus as set forth in claim 16, wherein adhesive is disposed between the building blocks of the radiation conversion element array.

18. An apparatus comprising:
a plurality of radiation conversion elements that convert radiation light; and
a reflector layer disposed around the plurality of radiation conversion elements;
wherein the reflector layer includes protruding spacer elements or structures effective to ensure an air gap between the reflector layer and the radiation conversion elements sufficient to support total internal reflection at an inner surface of the radiation conversion elements.

19. An apparatus comprising:
a radiation conversion element that converts radiation to light; and
a reflector layer disposed around the radiation conversion element, the reflector layer comprising a light-reflective layer disposed adjacent the radiation conversion element and a light barrier layer which is separate from the reflector layer and is disposed distal from the radiation conversion element.

20. The apparatus as set forth in claim 19, wherein the light barrier layer comprises an aluminum layer.

21. The apparatus as set forth in claim 19, wherein the light barrier layer is disposed on the reflector layer as a deposited layer that is deposited on a backside of the reflector layer distal from the radiation conversion element.

22. The apparatus as set forth in claim 19, wherein the light-reflective layer comprises a multi-layer polymer reflector.

23. The apparatus as set forth in claim 19, further comprising:
an optical detector element optically coupled with the radiation conversion element to define a single pixel of a radiation detector array having a one-to-one correspondence between radiation conversion elements and optical detector elements;
wherein a cross-sectional area of the combination of the radiation conversion element and the reflector layer disposed around the radiation conversion element is equal to or less than a cross-sectional area of the optical detector element optically coupled with the radiation conversion element.

24. The apparatus as set forth in claim 23, wherein the cross-sectional area of a combination of the radiation conversion element and the reflector layer disposed around the radiation conversion element is equal to the cross-sectional area of the optical detector element optically coupled with the radiation conversion element.

25. An apparatus comprising:
a two-dimensional array of radiation detector elements, wherein each radiation detector element of the two-dimensional array of radiation detector elements includes:
a radiation conversion element that converts radiation to light, the radiation conversion element having light-reflective sides; and
an optical detector element optically coupled with the radiation conversion element to define a single pixel of a radiation detector array having a one-to-one correspondence between radiation conversion elements and optical detector elements;
wherein a cross-sectional area of the radiation conversion element having light-reflective sides is equal to or less than a cross-sectional area of the optical detector element optically coupled with the radiation conversion element.

26. The apparatus as set forth in claim 25, wherein, for each radiation detector element of the two-dimensional array of radiation detector elements, the cross-sectional area of the radiation conversion element having light-reflective sides is equal to the cross-sectional area of the optical detector element optically coupled with the radiation conversion element.

* * * * *